335-42 S9
11/4/86 CR RE 32,279

United States Patent [19]

Bruchet

[11] E Patent Number: Re. 32,279

[45] Reissued Date of Patent: Nov. 4, 1986

[54] INTERCHANGEABLE TRIPPING DEVICE FOR A CIRCUIT-BREAKER

[75] Inventor: Michel Bruchet, St-Quentin, France

[73] Assignee: UNELEC S.A., Paris, France

[21] Appl. No.: 49,488

[22] Filed: Jun. 15, 1979

Related U.S. Patent Documents

Reissue of:

[64] Patent No.: 4,130,814
Issued: Dec. 19, 1978
Appl. No.: 787,267
Filed: Apr. 13, 1977

[30] Foreign Application Priority Data

Apr. 21, 1976 [FR] France ..... 76 11688

[51] Int. Cl.[4] ..... H01H 71/74
[52] U.S. Cl. ..... 335/42; 335/176
[58] Field of Search ..... 335/42, 45, 132, 176; 337/71, 82

[56] References Cited

U.S. PATENT DOCUMENTS

| | | | |
|---|---|---|---|
| 3,559,120 | 1/1971 | Myers | 335/42 |
| 3,906,414 | 9/1975 | Kidd et al. | 335/42 |
| 4,037,183 | 7/1977 | Gaskill | 335/132 X |
| 4,064,469 | 12/1977 | Gryctko | 335/132 X |

OTHER PUBLICATIONS

Circuit Breakers, Series Novomax, pp. 2, 24, 26, 28, 30.

*Primary Examiner*—George Harris
*Attorney, Agent, or Firm*—Sughrue, Mion, Zinn, Macpeak and Seas

[57] ABSTRACT

A trippiong device of a circuit-breaker is detachable so as to be able to cover ranges of excess currents with a small number of calibers each represented by an interchangeable tripping device. For this purpose, the magnetic excess current detection circuits are made in two detachable parts, one fixed to the tripping device, the other installed floating on the housing of the device to be controlled whose interchangeability permits the automatic changing of the magnetic characteristics of the tripping device.

9 Claims, 7 Drawing Figures

INTERCHANGEABLE TRIPPING DEVICE FOR A CIRCUIT-BREAKER

Matter enclosed in heavy brackets [ ] appears in the original patent but forms no part of this reissue specification; matter printed in italics indicates the additions made by reissue.

FIELD OF THE INVENTION

The present invention relates to an interchangeable tripping device for a circuit-breaker and having means for the detection of excess current which operates a tripping mechanism of said circuit-breaker; it relates in particular to means for splitting up the structure of said detection means to permit simple interchangeability of the tripping devices in particular without disconnecting the current-passing conductors of the circuit breaker.

PRIOR ART

Tripping devices associated with circuit-breakers are known in which:

The overload current detection means comprises, for each pole: a generally laminated magnetic circuit surrounding a current-passing conductor, a conductive ring surrounding a part of said magnetic circuit and thus forming the secondary winding of a current transformer whose primary winding is constituted by said current-passing conductor and a thermal switch thermally connected with the conductive ring and operating a tripping mechanism; The short-circuit current detection means comprises for each pole:

A stationary magnetic circuit partially surrounding the current-passing conductor and a mobile magnetic armature held in an abutting position at a distance from the stationary magnetic circuit by a return spring and operating a tripping mechanism.

Lastly, said detection means is installed with the tripping mechanism in a tripping device fixed on the circuit-breaker casing and thus permitting the use on the same circuit-breaker casing of tripping devices of different ratings chosen as a function of the operation current of the circuit which the circuit-breaker is to protect.

Embodiments are also known for effecting of the interchangeability of such tripping devices by opening the electric circuit of each pole of the circuit-breaker based on the detection means used:

One of these embodiments consists in making the current passing conductors, around which the magnetic excess current detection circuits are arranged, integral with the tripping device; said current passing conductors are then fixed with the tripping device on the circuit-breaker casing and series-connected with the electric conductors of each of the poles of the circuit-breaker; in another embodiment, the current passing conductors are made independent from the tripping device and are installed on the circuit-breaker casing by a separable connection so as to be able to dispose the interchangeable tripping device on the circuit-breaker while passing said conductors through the windows formed by the magnetic circuits and then re-establishing the connections.

Such dispositions have two disadvantages: an electrical disadvantage and a mechanical disadvantage: from the electrical point of view, it is necessary to provide in each pole of the circuit-breaker separable electric connections which serve only for the interchangeability of the tripping device and the engagement of which, after each change of rating can cause a defective electric contact; while from the mechanical point of view, particular dispositions must be taken for multipolar devices because of industrial manufacturing tolerances, so as to ensure simultaneously proper electric connection of the current passing conductors and accurate mechanical positioning of the interchangeable tripping device.

SUMMARY OF THE INVENTION

The present invention aims to remedy these disadvantages by substituting the opening of the magnetic circuits for the opening of the electric circuits. The interchangeability of the tripping device is then obtained without its being necessary to disconnect the current-passing conductors, the magnetic circuits being constituted by two separate parts; while the interchangeable tripping device is accurately positioned on the circuit-breaker casing by particularly simple mechanical fixing means. Hence, interchangeable circuit-breaker tripping devices can be simply manufactured by using a small number of sub-assemblies, namely a circuit-breaker and a tripping device of determined rating chosen from a series of modular tripping devices with guaranteed interchangeability covering the operational possibilities of said circuit-breaker.

The tripping device according to the invention is characterized in that the circuit-breaker comprises a casing, a current-passing conductor and a control mechanism operable by the tripping device to break the circuit of the current-passing conductor; the tripping device including excess current detection means in the form of a magnetic circuit which, in operation, surrounds the current-passing conductor, the magnetic circuit being made of two separable parts, one of which is installed in said casing and the other separable part being removable and integral with said interchangeable tripping device.

BRIEF DESCRIPTION OF THE DRAWINGS

An embodiment of the invention is described by way of example with reference to the accompanying drawings in which.

DETAILED DESCRIPTION

Figure 1:
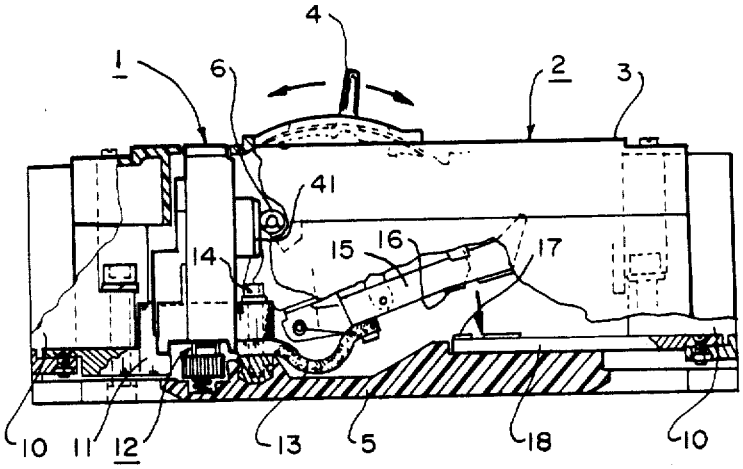
FIG. 1 is an elevation view in partial cross-section of a three-phase circuit-breaker equipped with an interchangeable tripping device embodying the invention.
Figure 2:
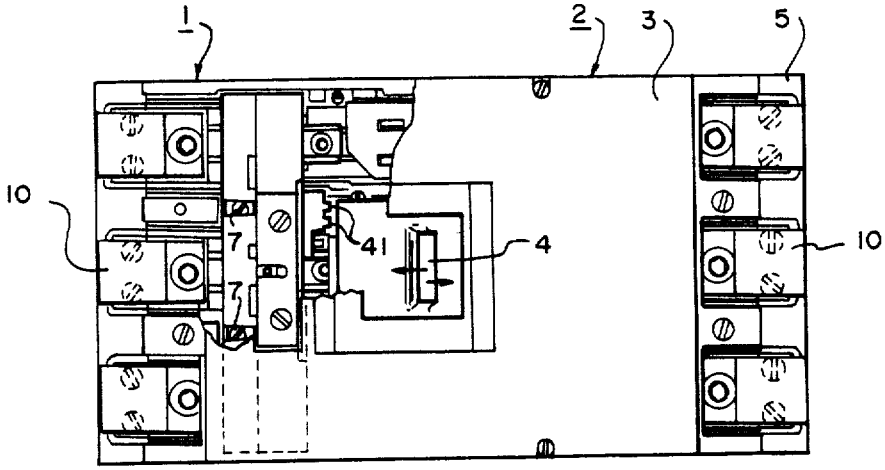
FIG. 2 is a partly cutaway top view of the circuit-breaker with the interchangeable tripping device of FIG. 1.
Figure 6:
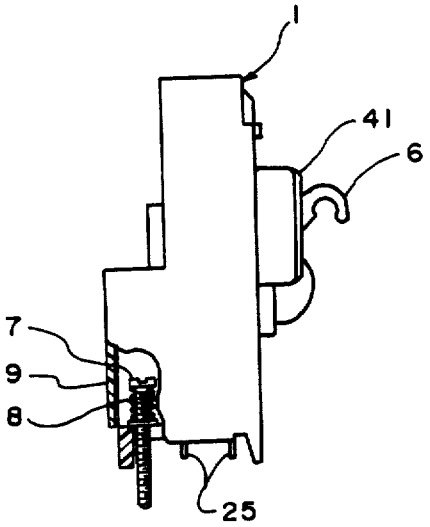
FIG. 6 is a partly partial cross-section profile of the tripping device of FIG. 3.

FIGS. 1 and 2 show an interchangeable tripping device 1 embodying the invention associated with a known three-pole circuit-breaker 2 comprising a casing formed of a stand 5 and a closing hood 3 together with a manipulation handle 4. The tripping device 1 is positioned on the circuit-breaker 2 by a hook 6 and a guide rail 41, with the required accuracy with respect to the control mechanism of said circuit-breaker 2 and fixed to the stand 5 by screws 7 with springs 8 inserted between the heads of screws 7 and a flat part of an insulating casing 9 of the tripping device 1 and through which the screws 7 pass (FIG. 6). The current of each phase passes through the circuit-breaker successively via a left-hand terminal 10; a rigid conductor 11 which passes through a magnetic circuit 12 for each pole; a flexible conductor 13 fixed to said rigid conductor 11 and to the stand 5 by a screw 14; a mobile arm 15 connected thereto; a mobile contact 16 mounted on the arm 15; a stationary contact 17 (when the circuit-breaker is closed); a stationary conductor 18 on which said stationary contact 17 is mounted; and finally a right-hand terminal 10.

Figure 3:
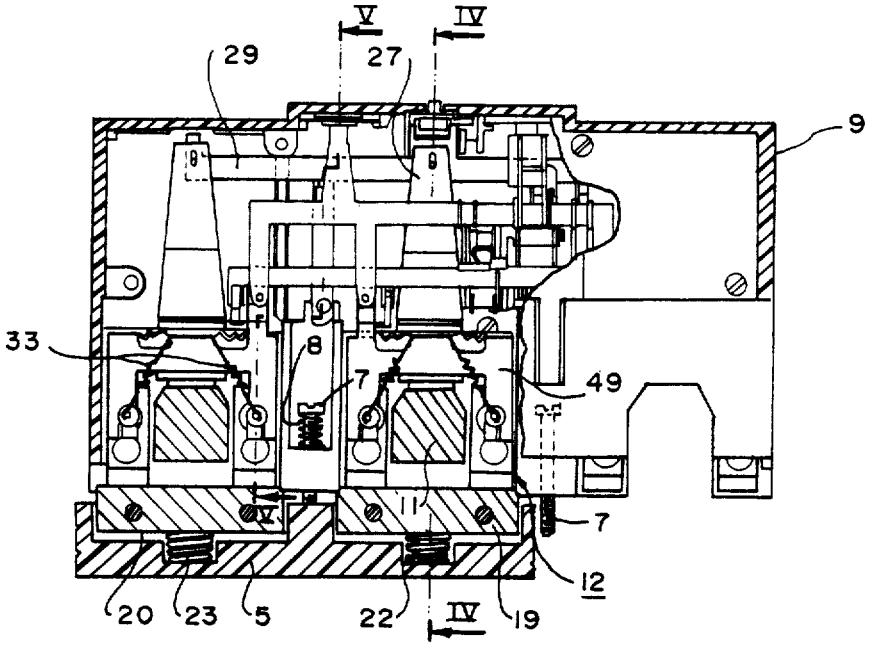
FIG. 3 is an enlarged elevation view in partial cross-section of a detachable three-phase tripping device shown in FIGS. 1 and 2.

In FIG. 3, the magnetic circuit 12 of each pole comprises two separable parts, one of which parts 19 is installed in a floating position in a recess 20 of the stand 5, the other part 49 being installed on the casing 9 of the tripping device 1.

A spring 22 disposed in a recess 23 of the stand 5 and lying between said stand 5 and said floating part 19 holds this floating part pressed against the part 49.

Figure 4:
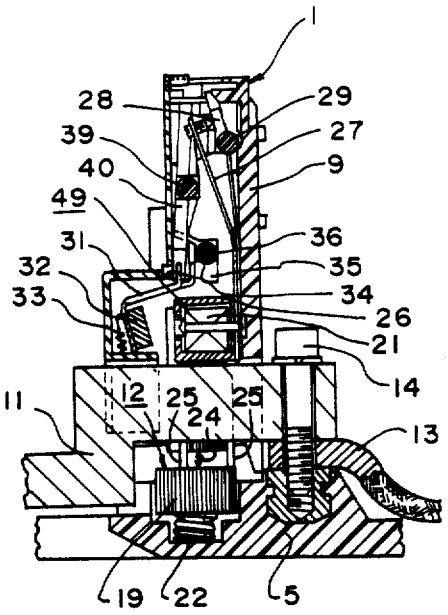
FIGS. 4 and 5 are transverse cross-sections respectively taken along lines IV—IV and V—V of the tripping device in FIG. 3.

In FIG. 4, the air gap 24 which exists between the two separable parts 19 and 49 of the magnetic circuit 12 is determined by two non-magnetic metal sheets 25 situated on either side of the laminations 21 of the said other part 49 and on which the said one magnetic part 19 abuts due to the effect of the spring 22. The central portion of the U-shaped laminations 21 (FIG. 7) is surrounded by a conductive ring 26 forming a short-circuit turn for the secondary winding of the transformer, for which the conductor 11 forms the primary winding, while the other end of a thermal switch 27 in thermal contact with said ring 26 operates an arm 28 on an auxiliary thermal release shaft 29 to which it transmits its thermo-mechanical movement.

Figure 5:
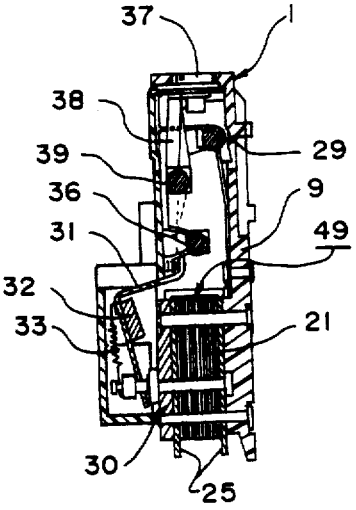

In FIG. 5, the electromagnetic short-circuit detector includes a pair of soft steel plates 30 forming a separable part of a magnetic circuit fixed to the laminations 21 and the non-magnetic metal sheets 25 on the insulating casing 9 of the tripping device 1. The short-circuit detector also includes a magnetic armature 32 fixed to a mobile plate 31 fitted with return springs 33.

When there is a short-circuit, the current passing through the conductor 11 energizes the magnetic circuit which includes the soft steel plates 30 and which is completed across the spring-loaded portion 19 of the magnetic circuit 12 which surrounds said conductor 11. The soft iron plates 30 then attract the armature 32 fixed on the mobile plate 31 which has an end 34 that operates an electromagnetic tripping arm 35 (FIG. 4). The short-circuit current is adjusted to cause tripping by means of a knob 37 which operates an adjusting arm 38 which rotates an adjusting bar 39 which has another arm 40 (FIG. 4) that varies the distance between the armature 32 and the soft steel plates 30.

In FIG. 6, the means for accurate positioning of the hook 6 of said tripping device with respect to the control mechanism of the circuit-breaker 2 is shown. FIG. 6 also shows the fixing, by means of the screws 7 with the interposed springs 8 (compatible with the wide manufacturing tolerances for the casing 9) said tripping device 1 to the stand 5 of the circuit-breaker 2. The resilient bias of the springs 8 determines the application force of the tripping device on the circuit-breaker without any danger of deformation detrimental to the proper operation of the device.

Figure 7:
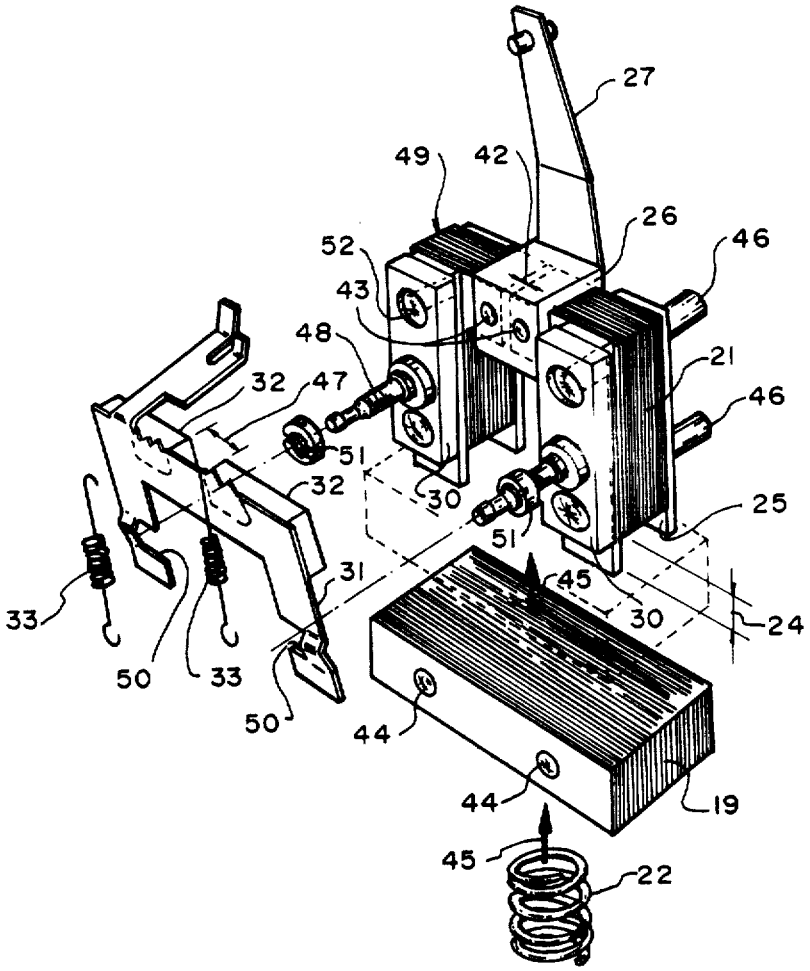
FIG. 7 is a perspective exploded view of the parts of the separable overload detection magnetic circuit and of the parts of the associated short-circuit detection magnetic circuit of the same pole and energized by the same phase current conductor.

In FIG. 7, the enlarged view of the magnetic circuits which take part in the detection of excess currents makes it possible to understand better the manufacture, assembly and operation thereof.

The magnetic overload detection circuit comprises a U-shaped yoke of laminations 21 made of magnetic metal sheets with a fixed air gap 42 (which could be zero) and which is maintained by inserting stacks of laminations in the ring 26 and by fixing the assembly in position by rivets 43. The magnetic part 19 of parallelepiped shape is formed by laminations assembled by rivets 44 and is held pressed against the non-magnetic metal sheets 25 by the spring 22 placed below and exerting its effect in the direction of arrows 45. The air gap 24 between the yoke part 49 and the spring loaded part 19 is chosen as a parameter for determining the various ratings of the interchangeable tripping devices and therefore results from the choice of the length of the non-magnetic metal sheets 25 which makes it possible to vary this air gap from a maximum to zero.

The spring-loaded magnetic part 19 is common to the magnetic overload detection circuit and to the magnetic short-circuit detection circuit which includes the two soft steel plates 30 assembled with the non-magnetic metal sheets 25 and the laminations 21 by means of assembly rods 48. This assembly is fixed onto the insulation casing 9 of the tripping device by tubular rivets 46. The armature 32 completes the short-circuit detection circuit and may be constituted by two portions determining a fixed air gap 47 between them.

Because of the small value of the eddy currents induced by the rated current of the circuit-breaker in this magnetic circuit, the magnetic parts 30 and 32 can be made of soft steel and need not be laminated.

The armature 32 is fixed on the mobile cut-out plate 31 articulated on threaded rods 48 crimped onto the yoke part 49 and used as a pivoting bearing surface for notches 50 formed on the plate 31. It is held in place by nuts 51. When there is a short-circuit, the armature 32 presses against the plates 30, the upper tubular rivets 46 being rivetted in bores 52 in the top part of the soft steel plates 30 to avoid any projection.

Many modifications of the present invention are possible within the scope of the claims. Thus, to cause tripping in the case of excess current, it is possible to use means other than the bending of a thermal switch by thermal effect or the movement of a mobile armature by an electromagnetic effect, provided that the detection means comprises (according to the invention) a magnetic circuit surrounding the current passing conductor, said magnetic circuit comprising two separable parts one of which is installed on the casing of the circuit-breaker, the other being fixed on the tripping device.

What is claimed is:

1. An interchangeable *three phase* tripping device for a *three pole molded case* circuit-breaker, wherein the circuit-breaker comprises a casing, a current-passing conductor *for each of the phases of the three pole circuit breaker*, and a control mechanism operable by the tripping device to break the circuit of the current-passing [conductor] *conductors of the three phases in unison*; said tripping device including *insulating case, common tripping mechanism, and* excess current detection means *for each phase* constituted as a magnetic circuit which, in operation, surrounds the *respective* current-passing conductor, the magnetic circuit being made of two separable parts, one of which is installed in said casing *of the molded case circuit-breaker* and the other separable part being [removable and integral with said interchangeable tripping device] *fixed in said insulating case of the tripping device* such that replacement of the interchangeable tripping device in the circuit-breaker can be made without disconnection of the current-passing [conductor] *conductors* of the circuit-breaker, *said other separable part of said excess current detection means for each phase acting on said tripping mechanism which is common for the three poles whereby there is excess current in one phase all three poles of the circuit-breaker are opened.*

2. An interchangeable tripping device according to claim 1, wherein the two parts of each magnetic circuit of the tripping device are held abutting against each other by resilient means when the interchangeable tripping device is fixed on the casing of the circuit-breaker.

3. An interchangeable tripping device according to claim 2, wherein the said one of the separable parts of the magnetic circuit is installed in a mobile configuration in the casing of the circuit-breaker in co-operation with the resilient means enabling the said one part to be held pressed against stops integral with the removable part, said stops determining an air gap between the two separable parts which air gap is fixed during production to determine the rated current at which the tripping device will operate.

4. An interchangeable tripping device according to claim 3, wherein the air gap is nil, the two parts being adjusted to abut directly against each other.

5. An interchangeable tripping device according to claim 2, wherein the said one of the separable parts of the magnetic circuit which is installed on the casing of the circuit-breaker in a mobile configuration, is disposed in a recess between the current-passing conductor and the bottom of said casing, the resilient means being constituted by a spring disposed between said one of separable parts and the bottom of the casing.

6. An interchangeable tripping device according to claim 3, wherein the excess current detection means comprises thermal overcharge detection elements comprising a conductive ring surrounding the removable part of the magnetic circuit and a thermal switch fixed on said conductive ring.

7. An interchangeable tripping device according to claim 3, wherein the excess current detection means comprises electromagnetic short-circuit detection elements comprising a mobile magnetic plate provided with a return spring, and including a magnetic circuit element which co-operates with the removable part of the magnetic circuit, and is attracted thereto when a short-circuit flows in the current-passing conductor.

8. An interchangeable tripping device according to claim 1, comprising a hook enabling the tripping device to be positioned accurately in relation to the control mechanism of the circuit-breaker and wherein interposed spring means enable the tripping device to be fixed and resiliently clamped on the casing of the circuit-breaker, enabling wide production tolerances on said circuit-breaker and on said tripping device.

*9. An interchangeable tripping device according to claim 1 wherein said control mechanism includes a common release shaft for the phases of the three pole circuit breaker, said other separable part of said excess current detection means for each phase being operatively coupled to said release shaft to operate the control mechanism.*

* * * * *